Sept. 13, 1966  O. MULLER-GIRARD  3,273,100
PLURAL MOVABLE CORE TRANSFORMER ASSEMBLY WITH ESCAPEMENT MEANS
Original Filed April 29, 1960
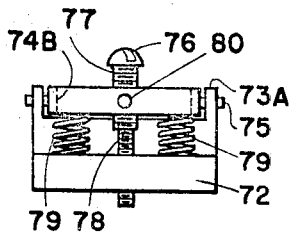
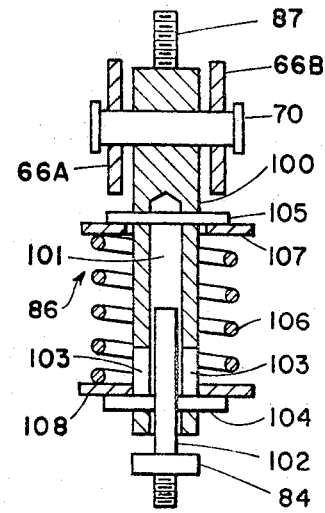
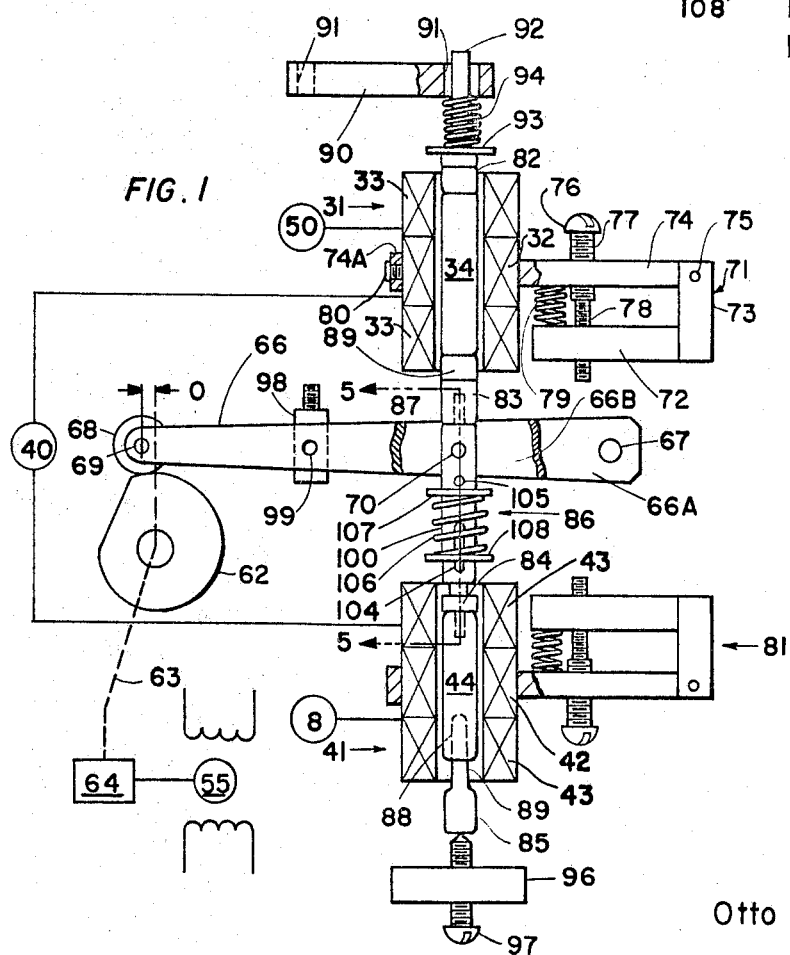
INVENTOR.
Otto Muller-Girard

United States Patent Office 3,273,100
Patented Sept. 13, 1966

3,273,100
PLURAL MOVABLE CORE TRANSFORMER ASSEMBLY WITH ESCAPEMENT MEANS
Otto Muller-Girard, Rochester, N.Y., assignor to Taylor Instrument Companies, Rochester, N.Y., a corporation of New York
Original application Apr. 29, 1960, Ser. No. 25,637, now Patent No. 3,173,003, dated Mar. 9, 1965. Divided and this application Dec. 8, 1964, Ser. No. 423,409
7 Claims. (Cl. 336—131)

This application for U.S. Letters Patents is a division of my prior copending application Ser. No. 25,637, filed April 29, 1960, and now Patent No. 3,173,003, issued March 9, 1965.

As disclosed in said patent, a measuring system of the null-balance type is caused to compute square root of an input signal by balancing said signal against, in effect, said signal multiplied by itself. The multiplication is achieved by means of a pair of movable core transformers arranged to electrically multiply, in effect, the input signal by itself, and by means of a servo arrangement moving the cores of the transformers as one, as is known in the art, to make the multiplied input signal equal to itself, with the result that the position of the said cores becomes a measure of the square root of the input signal. As disclosed further in said patent, the multiplication of the input signal causes difficulties at values of input signal in the vicinity of zero magnitude of said input signal, which are obviated by moving one core only when said input signal is in said vicinity.

The present invention relates to escapement means for controlling movement of said cores, and the object of the invention being to provide the combination including a plural movable core transformer assembly and escapement means so arranged that when the cores of said assembly are moved, they move together, except that in one part of their range of movement the escapement means acts to allow but one of said cores to move in that part.

In the drawings:
FIGURE 1 shows a pair of movable core transformers having their cores arranged for movement together under control of escapement means, as aforesaid;
FIGURE 2 is an enlarged view in section on the lines 5—5 of FIGURE 1; and
FIGURE 3 is an elevation of a detail of FIGURE 1.

The transformers of FIGURE 1 are shown to be linear variable differential transformers (LVDT's) 31 and 41 including primary windings 32 and 42, secondary windings 33 and 43, and cores 34 and 44, respectively. The electrical arrangement is illustrated to be, broadly, that disclosed in my aforesaid patent. Thus, primary winding 42 is energized by an electrical source 8, and couples the voltage across itself to the secondary winding 43 by transformer action. Secondary winding 43 energizes primary winding 32 via suitable interconnecting means, say amplifier 40 of my said patent, and the voltage across winding 32 is coupled to secondary winding 33 by transformer action. Secondary winding 33 is connected to any suitable means, such as the differential amplifier 50. The described arrangement, as is well known, provides the means 50 with a voltage that is a function of the square of the voltage across winding 43. The magnitude of the voltage across winding 33 also depends on the positions of cores 34 and 44. Thus, if the position of each core is changed, and each such change is such as would, say, increase the voltage across winding 33, such voltage increase is a function of the product of core position changes.

In the mechanism illustrated in FIGURE 1 moving cores 34 and 44, a rotary cam 62 is mounted on a rotatable shaft 63, forming part of a drive mechanism 64, which last represents mechanism for providing the position output of motor 55 in the form of rotation of shaft 63. In a typical case, driving mechanism 64 will include a train of reduction gears or equivalent for converting the many revolutions of a typical servomotor to approximately one revolution of shaft 63, and therefore of cam 62, over the entire range of core movement.

A lever 66, having one end pivoted at 67 for deflection of its other end in the plane of rotation of cam 62, has a spherical or cylindrical follower 68, pivoted for rotation on a pin 69 fixed to the said other end of lever 66, said pin oriented so that follower 68 rotates about an axis parallel to the axis of rotation of cam 62. The cam and levers are arranged so that the follower 68 rests on the periphery of cam 62. Taking a vertical line through the center of rotation of cam 62, the pivot 67 is so located that the line or point of contact between cam 62 and follower 68 is offset (as indicated at O in FIGURE 1) slightly from said vertical line, the offset being to that side of the vertical line such that the tangent to the surface of the cam at the contact between it and follower 68 is more nearly parallel to the lever arm of the lever than it would be if the offset were zero or on the other side of said vertical line. The offset allows the deflection of points on lever 66 to be treated as vertical displacements with less error than otherwise, whereas the more nearly horizontal the said tangent, the more nearly the said vertical displacement remains fixed in the face of thermal expansion of the structural elements involved.

Suitable support means (not shown) are provided for rotatably supporting the shaft 63 and pivot 67 in positions that are fixed in space relative to each other.

Cam 62 is a simple linear rise cam, i.e., if cam 62 is rotated counterclockwise from the position shown, the radius of the peripheral point of cam 62 contacted by follower 68 decreases in direct linear proportion to the angle of rotation of the cam for most of a revolution thereof.

At some intermediate point of lever 66, a pivot 70 is provided for pivoted connection of said lever to a slug or core assembly, to be described later, the axis of pivoting being parallel to the pivot axis at pivot 67. Hence, as cam 62 is rotated, the pivot 70 is displaced in a slightly arcuate path that may be considered straight and vertical within the limits defined by the total rise of cam 62.

A pair of LVDT supports 71 and 81 are provided for supporting LVDT's 31 and 41 with their coil or winding assemblies coaxially arranged on either side of the lever. Since supports 71 and 81 are identical except that one is inverted with respect to the other, a description of support 71 will suffice for both.

Support 71 comprises a fixed bracket composed of plates 72 and 73, secured at their ends at right angles to each other, and fixed in space relative to the cam shaft 63 and pivot 67 by support means (not shown). A third plate 74 has one end thereof pivoted at 75 to the upper end of plate 73, the axis of pivoting being oriented so that plate 74 can be deflected in the plane of deflection of lever 66.

A screw 76 cooperates with tapped holes in plates 72 and 74 to fix the angular position of plate 74 while permitting adjustment of its angular position, play between said plates being taken up by one or more springs 79 compressed between plates 72 and 74. Screw 76 includes a threaded portion 78, tapped into plate 72, and a threaded portion 77, tapped into plate 74, the pitch of the latter threaded portion being coarser than that of the former in order that as the screw is turned, the length of threaded portion 79 passing through plate 74 will be greater than that passing through plate 72. One (or both) of the holes tapped in plates 72 and 74 for screw 76 is made a slightly loose fit for the screw portion threaded therein, in order to allow for the tilting of the screw axis as screw 76 is turned.

The free end of plate 74 terminates in an apertured portion 74A, in which the cylindrical winding assembly of LVDT 31 is fixed by means of set screw 80.

LVDT supports 71 and 81 are fixed in position so that the axes of cores 34 and 44 and their displacement path substantially coincide with a vertical line through pivot 70 on lever 66.

The overall core assembly comprises cores 34 and 44, spacers 82, 83, 84 and 85, and an interconnecting and escapement device, indicated generally by reference numeral 86. Device 86, which will be described later, is connected to pivot 70, and at either end to spacers 83 and 84.

Each of the said spacers are generally cylindrical with threaded pin elements, such as shown in broken line at 88, tapped into core 44, there also being provided flats such as shown at 89 on those parts of spacers adjacent core ends to reduce eddy currents in the spacers. Each spacer element may be alike in respect of the said pins and flats.

At its upper end spacer 82 is terminated by a reduced-diameter, vertical guide element 92 passing through a hole 91 in fixed plate 90. Between the plate 90 and a washer 93 on guide element 92, a spring 94 is arranged to urge the spacer 82 toward lever 66 and device 86; device 86 having a threaded pin 87, tapped into spacer 83.

The remainder of the core assembly, namely spacers 84 and 85, and core 44 are supported by device 86. However, an adjustable stop screw 97, arranged to thread up and down, through a fixed plate 96, limits the downward travel of core 44, device 86 being provided with overthrow or escapement means that allow lever 66 to continue to let core 34 and its spacers down, even though the lower end of spacer 85 is in contact with the other end of stop screw 97.

FIGURE 2 illustrates connecting and escapement device 86 in detail, wherein the body of the device is shown to be a generally cylindrical body 100, having threaded pin 87 at its upper end for connection to spacer 83, and an axial bore 101 in the lower end thereof. Spacer 84 is provided with a vertical extension 102 loosely received in bore 101.

A pair of vertically extending slots 103 are provided opposite each other in the bored part of body 100, and extension 102 of spacer 84 has affixed thereto a cross pin 104, the ends of which pass through slots 103. Body 100 also has a cross pin 105 which is affixed to the body at any convenient point past the upper extremity of extension 102.

Cross pin 104 is urged against the lower ends of slots 103 by means of a spring 106 compressed between a pair of washers 108 and 107 between and abutting the respective pins 104 and 105. Spring 106 is chosen to be weaker than spring 94 (FIGURE 1).

Assuming that in the configuration of parts shown in FIGURE 1, there also obtains the configuration of parts shown in FIGURE 2, counterclockwise movement of cam 62 obviously cannot cause lever 66 to let down core 44, since stop screw 97 will not permit. However, as cam 62 rotates, spring 94, which is stronger than spring 106, forces follower 68 to remain in contact with the cam because the force of spring 94 causes body 100 to move down and, via pin 105 and washer 107, to compress spring 106, slots 103 permitting such motion.

For the purposes of illustration, take the position of cam 62 shown in FIGURE 1 to be that corresponding to the maximum value of square root, and take the arrangement to be such that the secondary voltages of the LVDT's are equal and have the same phase. Since, it is desired, as cam 62 begins to move counterclockwise, that both said voltages will decrease in linear proportion to the cam angle until some convenient point such as that where the cores 34 and 44 have moved downward through, say, 90% of their possible range of movement, stop screw 97 is far enough downward from the position shown in FIGURE 1 that the lower end of spacer 85 does not strike the upper end of the stop screw until the cam moves counterclockwise for 90% of one full turn thereof. During this movement, spring 106 will hold pin 104 against the lower ends of slots 103, whereby cores 34 and 44 will move as one and cause both of LVDT's 31 and 41 to cooperate to produce a voltage that represents the square of the core movement. Upon further downward motion, however, stop screw 97 prevents further downward movement of core 44, whereas core 34 continues downward alone. Therefore, the voltage output change of the transformer assembly is now proportional to the first power of the position change of core 34 causing said voltage output change.

A further guide bore 91 may be provided in plate 90 to receive the guide element of a third LVDT (not shown), the core assembly of which would be connected to a member 98 pivoted at 99 on lever 66, for the purpose of transmitting a square root signal to some remote apparatus such as a controller, indicator or the like. Obviously, any or several of a number of types of transmitting devices, which specifically differ from LVDT's may be actuated by the position output of lever 66 or by the angular position output of shaft 63, for the purpose of converting said position output or said angular position to various types of signals representing core position.

FIGURE 3 is an end view (from the left as seen in FIGURE 1) of support 71 (and of support 81, inverted). The aperture in plate portion 74A is shown in broken line and denoted by the reference numeral 74B. Plate 73 is seen to have upstanding ears 73A through which pivot pin 75 passes to pivotally support the right extremity (as seen in FIGURE 1) of plate 74, and there is seen to be two springs 79 loading the plate assembly.

The set screw 80 is used to roughly position the cylindrical body of the LVDT 31 (not shown in FIGURE 3) in aperture 74B, and likewise in the case of support 81 and LVDT 41. Initially, with stop screw 97 backed-off, the zero flow radius of cam 62 in contact with follower 68, LVDT's are adjusted roughly as aforesaid to vertical positions where their secondary voltages are close to null. The screw 76 of support 71 (and its counterpart in support 81) are then used as fine adjustments to get an exact null. Supposing the LVDT's to be linear, their secondary voltages will remain in a constant ratio to one another (1:1, if the LVDT's are identical) as the cam 62 is rotated to bring increasing rise to follower 68. This state of adjustment having been reached, stop screw 95 may be turned up until it just contacts the bottom of spacer 85 at the desired point, as more particularly explained hereinbefore.

The height of adjustment of stop screw 97 depends on the particular use of the transformer assembly. The example herein is for the flow measuring system disclosed in my aforesaid patent and is merely illustrative.

It will be noted that adjusting the mechanism involves establishing a zero point for cam 62 at LVDT null. If cam 62 were a non-linear cam, say, with a rise proportional to the square of the cam angle, relating cam zero and LVDT null would be quite difficult. That is, while in theory a square function cam and one balancing LVDT could be used to extract square root, one point on the cam would have to be exactly located in terms of LVDT output. Any error in locating that point would be a progressively varying error due to the nature of the non-linear rise of the cam, and this error would be in addition to those involved in profiling the cam in manufacture.

With the linear cam 62, however, there is no zero error due to the fact that the rate of rise of the cam is constant. The only consideration in choosing a cam zero would be to orient it so that enough cam travel is left to cause the LVDT cores to move full range, in direct proportion to cam angle.

A little reflection will show that any conceivable non-linear linkage poses a problem in zeroing it. In the particular case of a non-linear cam, it would also be difficult to switch over from square root to first power operation as simply and accurately as this is done in the system of FIGURE 1.

The foregoing description will enable those skilled in the art to practice my invention in the best form known to me thus far. It will be evident to those skilled in the art that various modifications of the invention may be made without departing from the scope and spirit of the invention and its objects as these appear herein. I therefore desire that the claims appended hereto be construed accordingly, at least to the extent permitted by the limitations directly expressed therein.

I claim:
1. A core assembly for a variable transformer arrangement including a pair of transformers, each having a movable core and a plurality of windings inductively coupled together to a degree depending on the position of said core relative thereto, said core assembly comprising a pair of cores coupled together for simultaneous movement of both in consequence of motion applied to either core, and escapement means mechanically coupling said cores, said escapement means including a resilient member and a pair of elements, one on each core, said resilient member being supported between said elements and so arranged as to oppose movement of one of said elements toward the other of said elements, whereby motion of one of said elements is transmitted via said resilient member to the other of said cores.

2. The invention of claim 1, wherein said elements are loosely interlocked together so as to permit limited movement of said elements toward and away from each other, and said resilient means is arranged so as to force said elements away from each other to the extent of said limited movement.

3. The invention of claim 1, wherein one of said elements has an elongated slot, and the other of said elements has a pin projecting into said slot, said resilient means being arranged to force said pin against one extremity of said slot, said slot extending along the direction of core movement.

4. The invention of claim 1, in combination with circuit means interconnecting said windings such that if one of said windings of one said transformer has a voltage applied thereto, one of said windings of the other said transformer will produce a voltage representative of the product of said core positions.

5. The invention of claim 4, wherein said elements are loosely interlocked together so as to permit limited movement of said elements toward and away from each other, and said resilient means is arranged so as to force said elements away from each other to the extent of said limited movement.

6. The invention of claim 4, wherein one of said elements has an elongated slot, and the other of said elements has a pin projecting into said slot, said resilient means being arranged to force said pin against one extremity of said slot, said slot extending along the direction of core movement.

7. In a combination, wherein there are provided a first transformer and a second transformer, each said transformer having a first winding, a second winding, and a core, said core being positionable such as to variably couple said windings together; wherein there is provided circuitry coupling the voltage of a said first winding of one said transformer across a said first winding of the other said transformer, whereby A.C. voltage across one said second winding will cause an A.C. voltage to appear across the other said second winding representative of the product of the positions of said cores; and wherein there is provided means movable through a range of positions, said means being connected to said cores for positioning each said core simultaneously through a range of positions;
 the improvement in said combination,
 wherein said means includes escapement means, said escapement means being constructed and arranged to effectively disconnect the first said means from but one said core when said first said means is in a given portion of its said range of positions;
 wherein there is stop means arranged to stop motion of the other of said cores when the said first said means moves into said given portion of its said range of positions; and
 wherein said escapement means is constructed and arranged to effectively disconnect said other of said cores from said first said means in response to stopping of motion of said other of said cores.

References Cited by the Examiner
FOREIGN PATENTS
449,324   6/1948   Canada.

LEWIS H. MYERS, *Primary Examiner.*

JOHN F. BURNS, ROBERT K. SCHAEFER, LARAMIE E. ASKIN, *Examiners.*

C. TORRES, *Assistant Examiner.*